United States Patent Office 3,187,246
Patented June 1, 1965

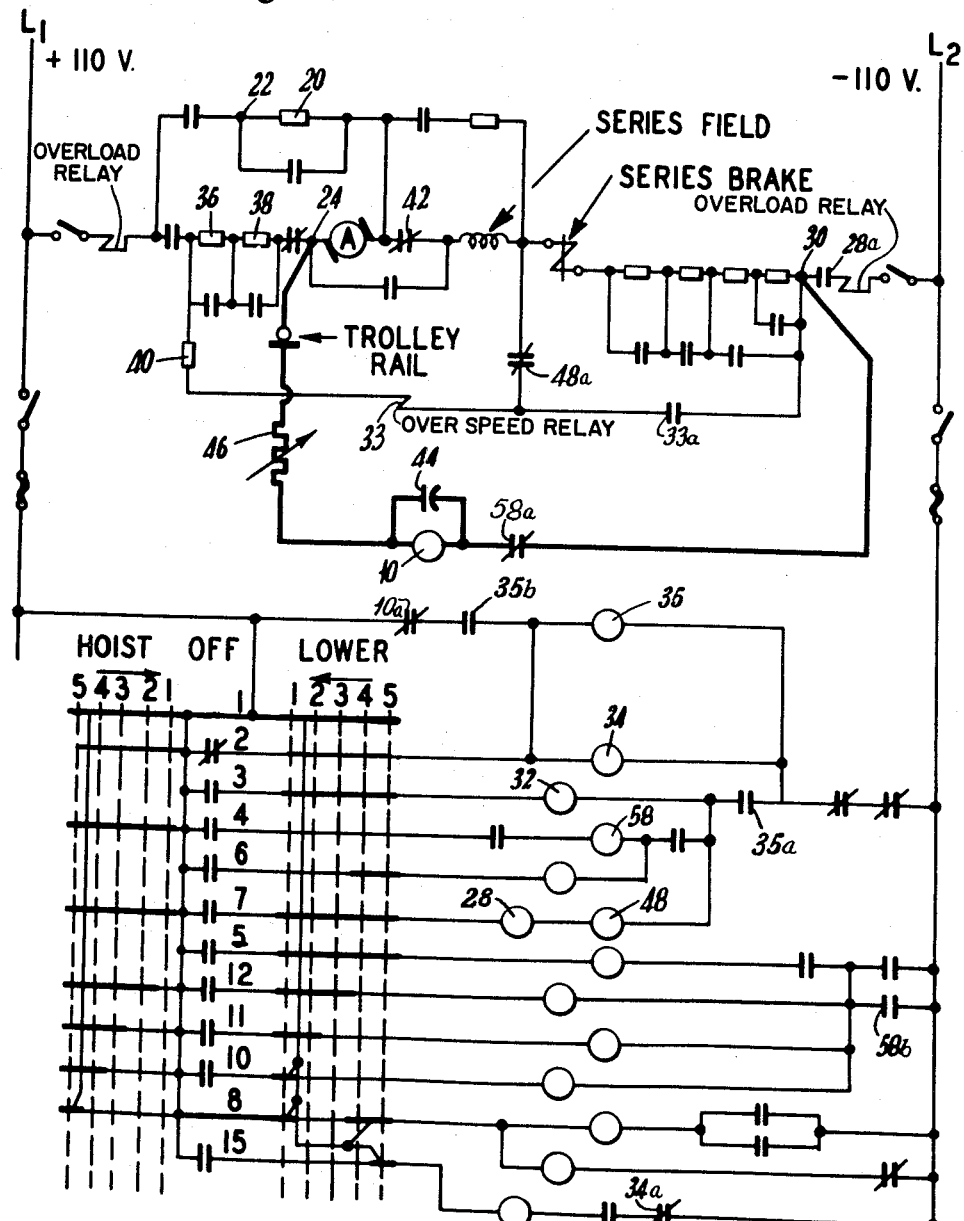

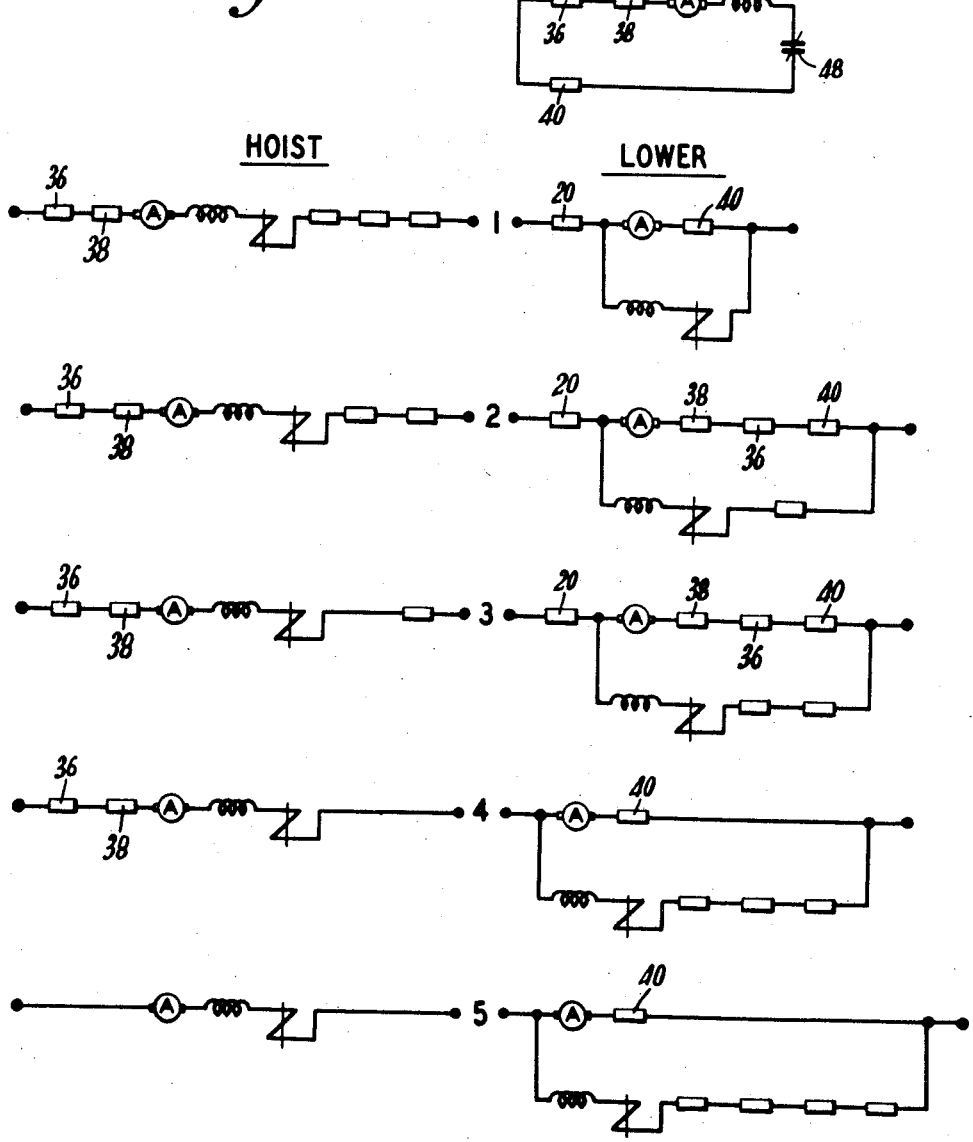

3,187,246
PROTECTIVE RELAY CIRCUITRY FOR HOIST
MOTOR CONTROLS
Harry G. Garten, Alloy, W. Va., assignor to Union
Carbide Corporation, a corporation of New York
Original application Nov. 8, 1957, Ser. No. 695,282, now
Patent No. 3,021,465, dated Feb. 13, 1962. Divided
and this application Apr. 19, 1961, Ser. No. 104,101
1 Claim. (Cl. 318—247)

This is a division of application Serial No. 695,282, filed November 8, 1957; now Patent No. 3,021,465 dated February 13, 1962.

This invention relates to a protective circuitry for use with direct current hoist motors and controllers therefor on overhead cranes and the like. More particularly, it relates to a relay circuit which prevents loss of control of the motor during lowering due to a failure in that portion of the armature circuit which is common to the field circuit.

Industrial power applications require crane hoisting motors which must be able to withstand rigorous extremes of operating conditions. The motors and their associated control circuits must be capable of handling heavy loads while maintaining a high degree of control at all times. In addition, the motors and control circuits are subjected to extremely high currents and often operate in highly corrosive atmospheres both of which adversely affect conductive contacts and the control elements themselves and can result in periodic circuit failures.

The type of motor most often employed for operation of the hoisting mechanism of various cranes is the series wound D.C. motor. The series motor is admirably adapted to the purpose because of its inherent characteristic of adjusting its speed inversely with load; this prevents excessive power demands with heavy loads and provides desirable high speeds at light loads.

The circuits employed almost universally for control of D.C. crane motors comprises a series connection for hoisting with various resistors in series that may be incrementally removed to increase the speed of hoisting. The series connection will not work for lowering as an overhauling load would cause the motor to run away. Therefore, by connecting the armature and field in parallel, with resistance in each circuit, characteristics approaching a shunt motor are obtained. With a light load the motor drives the hook down taking a relatively heavy current from the line. When the load is sufficient to overcome the friction of the drive, it begins to overhaul the motor, which then acts as a generator and retards the load by the associated motor effect against the direction of rotation. The speed of lowering may then be changed by varying the resistance in either the series field or the armature circuit to vary this retarding motor effect. While there are many different controls provided by different manufacturers, all operate on the same general principles, i.e., varying series resistance on the hoist cycle to change speed and varying resistance in the field or armature circuits for speed control on the lowering cycle.

It is to be understood that an overhauling load is one which will cause the armature speed, when the motor is operating in the lowering direction, to increase to the point where the generated counter electromotive force exceeds the line voltage and the motor operates as a generator.

For a detailed circuit operation of a dynamic lowering control, reference is made to Chapter 13 of "Control of Electric Motors" by P. B. Harwood, John Wiley & Son, Inc., New York. This description applies to a Cutler-Hammer controller of the same type described hereinbelow for illustrative purposes with the apparatus of this invention.

Most crane hoist equipment contains many standard safety features such as the series magnetic brake which allows the cable drum or armature to turn only when there is power available to operate the motor and release the brake shoe. Also the "off" position on most controllers automatically short circuits the field and armature to give dynamic braking to control the load partially in the event that the magnetic brake should fail. Limit switches to avoid over-hoisting are also well known and operate on obvious principles. Overload relays are also commonly used to open the motor circuit in the event of unusually high currents due to heavy loads. Most equipment utilizing dynamic lowering also has means for limiting the amount of resistance which can be inserted in the field circuit when an overhauling load is being lowered. This limits minimum field strength, and thus limits the maximum lowering speed.

When the crane is lowering with an overhauling load, the motor effect due to the generator action is the only retarding effect on load speed. If an open should occur in the shunt armature circuit, no current can flow, therefore, the braking or retarding force is lost and the load rapidly runs away. In the majority of cases, the operator does not have time to move the controller to the "off" position before the load gains such momentum that the magnetic brake is unable to stop it.

In the past, complicated systems were sometimes used comprising extra trolley rails, brake shoes, commutators, etc. However, these safety devices were often the cause themselves of equipment failure and shutdown. Due to the failure of such attempts, this form of safety protection is not available on most standard controllers. However, experience has taught that in corrosive atmospheres as, for example, metallurgical plants, such failures do occur and can be disastrous to both equipment and personnel in the area.

It is, accordingly, an object of the present invention to provide a protective device for guarding against discontinuities in the shunt armature circuit of direct current crane hoist motors which is simple, rugged and dependable.

It is a further object of the present invention to provide a safety device for use with direct current crane hoist motors utilizing dynamic lowering whereby power is removed from the motor whenever an open circuit condition occurs in the shunt armature circuit during said dynamic lowering.

It is a still further object of the present invention to provide such a safety device for a crane hoist motor operating from a two-wire direct current source.

Other objects and advantages will be apparent from the following description and drawings in which:

FIG. 1 is a schematic showing the protective device of the present invention used with a two-wire, direct current, hoist control system; and FIG. 2 is a simplified schematic of the actual electrical circuits actuated in the various positions of the controller.

According to the teachings of this invention, a protective device is provided for a direct current hoist motor and controller therefor utilizing dynamic lowering, which interrupts the motor power supply in the event of any discontinuity in that portion of the shunt armature circuit which is in circuit with the field circuit during lowering.

It is to be understood that the subject matter of this invention is intended for use with direct current hoist motors utilizing dynamic lowering. Alternating current motors for this application are either of the simple squirrel-cage type or slip ring induction type and do not develop voltages or polarities suitable to operate such a protective device as disclosed.

The term "shunt armature circuit" as used in the specification and claims refers to the circuit including the motor armature winding which shunts the series field, the series brake and the associated speed control resistors which are employed when the motor is operated in the "lowering" direction.

Referring more particularly to FIGURE 1, the protective device of the present invention comprises a 250 volt direct current relay 10 having normally closed contacts, one 0 to 2000 ohm, 200 watt variable resistor 46, one 216 to 240 mfd. capacitor 44, and a normally closed contact 58a. Contactor 58a is operated by coil 58 in the controller, which disconnects the protective device from the circuit during hoisting operation.

In the invention, the protective device is connected, during lowering, directly in parallel with that portion of the shunt armature circuit to be protected. This portion is shown in the drawing as being between the points 24 and 30 and includes the motor armature winding, the series field, the series brake and associated resistors. The resistor 46 is adjusted to the maximum value whereby the relay coil 10 would be actuated by any discontinuity in the shunt armature circuit between points 24 and 30. Upon the occurrence of a discontinuity in the shunt armature circuit, exclusive of the motor armature winding the voltage across the relay coil 10 will increase and thereby cause relay coil 10 to be activated. The activation of relay coil 10 operates contactor 10a in the hold circuit of the controller. The hold circuit comprises relay coil 35 and its associated contacts one of which, 35a, deenergizes relay coils 28 and 48 whose contacts, 28a and 48a, respectively remove power from the motor, thus actuating the series brake, and also shorting the field across the armature thereby resulting in the almost instantaneous stopping of the motor.

It is of considerable practical importance that this protective relay device is made up of components of such size that they can readily be installed in existing control equipment enclosures as well as being incorporated in new equipment. The apparatus of the present invention does not require the installation of additional trolley rails and collector devices for its operation, all of which are particularly susceptible to corrosion and other mechanical failures.

While this invention has been described with respect to the particular controller as used by Cutler-Hammer, Inc., as described in the previously-mentioned publication, it is to be understood that it would operate equally well with any direct current crane hoist motor utilizing dynamic lowering.

While the invention has been described in a detailed manner with respect to certain embodiments as shown by the drawings, it is to be understood that modifications may be made in the control circuit and that no limitations other than those embodied by the scope of the appended claims are intended.

What is claimed is:

In combination with a direct current hoist motor and controller therefor supplied by a two-wire line, said controller being adapted to provide series operation for hoisting and shunt operation for dynamic lowering whereby in shunt operation the motor field winding is paralleled by a shunt circuit which includes the motor armature winding, a magnetic brake and electrical resistors; a protective device operable in the event of a discontinuity in the shunt circuit external to the motor armature winding, said device comprising relay means connected across said shunt circuit, said relay means having associated contactor means arranged to remove power from the entire motor when the relay is actuated.

References Cited by the Examiner
UNITED STATES PATENTS

| | | | |
|---|---|---|---|
| 1,713,202 | 5/29 | Warner | 317—13 |
| 2,421,080 | 5/47 | Newman | 318—247 |
| 2,721,300 | 10/55 | Myles | 317—13 |

OTHER REFERENCES

James H. D. and Markle, L. E., Controllers for Electric Motors, Second Edition, pages 29–31, McGraw-Hill, New York, 1952.

JOHN F. COUCH, *Primary Examiner.*

MILTON O. HIRSHFIELD, *Examiner.*